United States Patent
Rischen et al.

(10) Patent No.: US 10,421,164 B2
(45) Date of Patent: Sep. 24, 2019

(54) DEVICE AND METHOD FOR TRANSMITTING A MECHANICAL FORCE FOR DRIVING A PRESSING DEVICE FOR PRESS FITTINGS

(71) Applicant: Viega Technology GmbH & Co. KG, Attendorn (DE)

(72) Inventors: Christian Rischen, Eslohe (DE); Jörg Rosenthal, Reichshof-Eckenhagen (DE); Uwe Grünkemeier, Kaarst (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 0 days.

(21) Appl. No.: 15/999,359

(22) PCT Filed: Feb. 16, 2017

(86) PCT No.: PCT/EP2017/053508
§ 371 (c)(1),
(2) Date: Aug. 17, 2018

(87) PCT Pub. No.: WO2017/140785
PCT Pub. Date: Aug. 24, 2017

(65) Prior Publication Data
US 2019/0039194 A1 Feb. 7, 2019

(30) Foreign Application Priority Data
Feb. 19, 2016 (DE) .................. 10 2016 102 960

(51) Int. Cl.
*B23P 19/027* (2006.01)
*F15B 7/08* (2006.01)
(Continued)

(52) U.S. Cl.
CPC ............ *B23P 19/027* (2013.01); *B25B 27/10* (2013.01); *F15B 7/08* (2013.01); *B25B 7/126* (2013.01); *B25F 5/005* (2013.01)

(58) Field of Classification Search
CPC ....... B25B 27/10; B25B 7/126; B25P 19/027; B25F 5/005; F15B 7/08
(Continued)

(56) References Cited

U.S. PATENT DOCUMENTS

| 4,151,720 A | 5/1979 | Vanderstappen |
| 4,226,110 A | 10/1980 | Suganuma |

(Continued)

FOREIGN PATENT DOCUMENTS

| CN | 102434127 A | 5/2012 |
| CN | 102821984 A | 12/2012 |

(Continued)

*Primary Examiner* — Thomas E Lazo
*Assistant Examiner* — Richard C Drake
(74) *Attorney, Agent, or Firm* — The Webb Law Firm

(57) ABSTRACT

The invention is based on the technical problem of improving the pressing in of large press fittings, said problem being solved by a device for transmitting a mechanical force for driving a pressing device for press fittings, having a storage container (4) for hydraulic fluid, having a pump cylinder (8), having a working cylinder (12), having a first line (14) for connecting the storage container (4) to the pump cylinder (8), having a second line (16) for connecting the pump cylinder (8) to the working cylinder (12), and having a third line (18) for connecting the working cylinder (12) to the storage container (4), wherein means (20) for preventing a return flow into the storage container (4) are provided in the first line (14), wherein means (22) for preventing a return flow into the pump cylinder (8) are provided in the second line (16), wherein switching means (24) for opening and closing the third line (18) are provided, and wherein the swept volume (VA) of the working cylinder (12) is config- (Continued)

ured to be greater than the swept volume (VP) of the pump cylinder (8). The invention also relates to a corresponding method.

10 Claims, 7 Drawing Sheets

(51) Int. Cl.
  *B25B 27/10* (2006.01)
  *B25B 7/12* (2006.01)
  *B25F 5/00* (2006.01)

(58) Field of Classification Search
  USPC .............................................. 60/477
  See application file for complete search history.

(56) References Cited

U.S. PATENT DOCUMENTS

| | | | |
|---|---|---|---|
| 6,199,379 B1* | 3/2001 | Hung | B66F 5/04 60/479 |
| 6,564,610 B2 | 5/2003 | Lefavour et al. | |
| 6,622,485 B2* | 9/2003 | Hung | B66F 5/02 60/477 |
| 6,769,356 B2 | 8/2004 | Frenken | |
| 7,533,556 B2 | 5/2009 | Lefavour et al. | |
| 7,908,963 B2 | 3/2011 | Frenken | |
| 8,844,436 B2 | 9/2014 | Frenken | |
| 9,541,101 B2 | 1/2017 | Aneder et al. | |
| 10,054,139 B2 | 8/2018 | Toparcean et al. | |
| 2003/0126905 A1* | 7/2003 | Frenken | B21J 15/20 72/453.16 |
| 2004/0040296 A1* | 3/2004 | Fan | B66F 3/42 60/477 |
| 2006/0225415 A1* | 10/2006 | Obayashi | A47C 1/06 60/477 |
| 2008/0087144 A1 | 4/2008 | Rollins et al. | |
| 2010/0078931 A1 | 4/2010 | Nelson et al. | |
| 2012/0284990 A1 | 10/2012 | Rosenthal | |

FOREIGN PATENT DOCUMENTS

| | | |
|---|---|---|
| DE | 2836702 A1 | 3/1979 |
| DE | 10206801 A1 | 6/2003 |
| DE | 102009026273 A1 | 1/2011 |
| EP | 1270959 A2 | 1/2003 |
| EP | 2522464 A2 | 11/2012 |
| EP | 2835540 A1 | 2/2015 |
| EP | 2883658 A2 | 6/2015 |
| JP | 4977071 | 7/1974 |
| JP | 3121714 A | 5/1991 |
| JP | 2005288601 A | 10/2005 |
| WO | 2007141156 A1 | 12/2007 |
| WO | 2016010656 A1 | 1/2016 |

\* cited by examiner

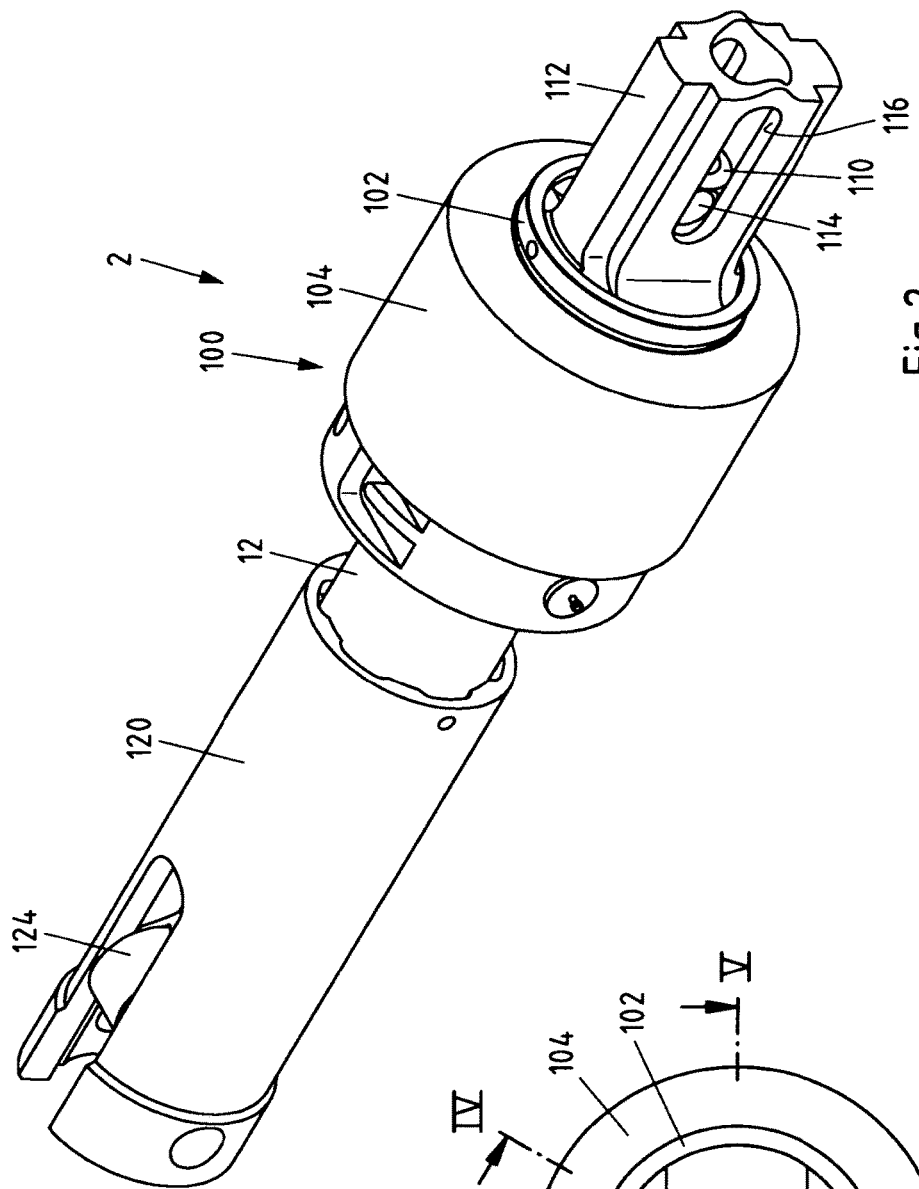
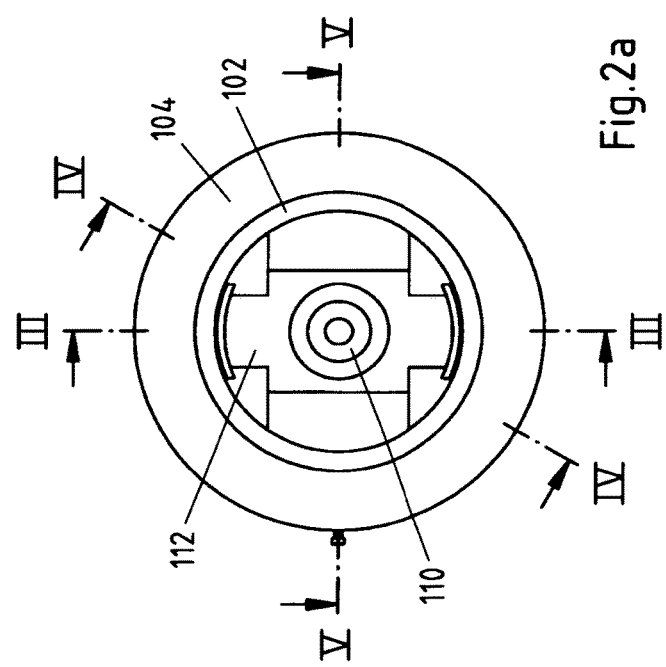
Fig.2
Fig.2a

DEVICE AND METHOD FOR TRANSMITTING A MECHANICAL FORCE FOR DRIVING A PRESSING DEVICE FOR PRESS FITTINGS

CROSS-REFERENCE TO RELATED APPLICATIONS

This application is the United States national phase of International Application No. PCT/EP2017/053508 filed Feb. 16, 2017, and claims priority to German Patent Application No. 10 2016 102 960.2 filed Feb. 19, 2016, the disclosures of which are hereby incorporated in their entirety by reference.

The invention relates to a device and a method for transmitting a mechanical force for driving a pressing device for press fittings.

BACKGROUND OF THE INVENTION

Press fittings are used for connecting pipes and/or fittings, wherein a permanently pressed and optionally non-releasable connection between the fitting and the pipe and/or the fitting can be produced by cold forming the fitting and with the aid of a seal. In addition, purely metallic connections are also known in which the fitting and a part of the pipe and/or fitting to be connected are deformed.

Field of the Invention

For pressing the press fitting, pressing tools are used which convert a linear force generated hydraulically or electrically into a pivoting movement of two pressing jaws that are movable relative to each other. For this purpose, on the one hand pressing jaws connected directly to the pressing tool can be provided, which are applied to the press fitting and then press it by compression. On the other hand, in particular in the case of larger dimensions of the press fitting, a pressing loop comprising at least two segments and two pressing jaws connected to the pressing tool can be provided, and these press the segments of the pressing loop and therefore press the press fitting.

Press fittings for pipes with large dimensions of, for example, more than 50 mm up to more than 150 mm external diameter, require both a large pressing force and a large pressing distance during pressing, however. It is only in this way that fittings with the pipes to be connected can be sufficiently deformed and reliable connections can be produced.

The work requirement for deforming such a large press fitting frequently exceeds the working capacity of the commercially available pressing machines, which are, for example, capable of ensuring a work of 32 kN*40 mm stroke or 45 kN*45 mm stroke. Accordingly, in the case of large dimensions, it is not possible to press the press fitting by means of a single pressing machine stroke. Multiple application of the pressing machine leads to an intermediate loss of pressing force and therefore the elastic pre-tension on the press ring, as a result of which the pressing process is impaired overall.

Description of Related Art

A two-stroke clamping jaw is known from the prior art of EP 2 522 464 B1 in order to counter this problem. However, the construction of the two-stroke clamping jaws is complex and therefore difficult to transfer into series production and construction site application. Furthermore, the elastic pre-tensioning of the press ring and the clamping jaw is lost in this system between the first and the second press-machine strokes. Correspondingly less working capacity is available for the overall deformation.

SUMMARY OF THE INVENTION

The present invention is therefore based on the technical problem of improving pressing of large press fittings.

The technical problem described above is solved according to the invention by a device for transmitting a mechanical force for driving a pressing device for press fittings with the features of claim 1.

According to the invention, a device is proposed as a hydraulic force-transmitting device that is arranged between the pressing machine and pressing jaws to be pivoted. The device is provided with a storage container for hydraulic fluid, having a pump cylinder with a pump piston, having a working cylinder with a working piston, having a first line for connecting the storage container to the pump cylinder, having a second line for connecting the pump cylinder to the working cylinder, and having a third line for connecting the working cylinder to the storage container, wherein means for preventing a return flow of hydraulic fluid from the pump cylinder into the storage container are provided in the first line, wherein means for preventing a return flow of hydraulic fluid from the working cylinder into the pump cylinder are provided in the second line, wherein switching means for opening and closing the third line are provided, and wherein the piston displacement of the working cylinder is configured to be greater than the piston displacement of the pump cylinder.

The described device also has a pump piston rod connected to the pump piston for connection to a pressing machine, and a working piston rod connected to the working piston for driving a pressing device. A receptacle for coupling to the pressing machine is connected to the pump piston rod. On the opposite side of the device, the working piston rod is connected to a pressing jaw receptacle, wherein a pressing jaw is driven to a pivoting movement by means of a known double roller plunger and compresses a press fitting or a pressing loop.

In the following, an entire pressing cycle is described by way of example, as can be carried out with the described device.

At the beginning of a pressing cycle, hydraulic fluid, preferably hydraulic oil, is pressed via the first line from the storage container into the pump cylinder, wherein the means, which are arranged in the first line for preventing a return flow, prevent the hydraulic fluid from flowing back into the storage container during a stroke of the pump cylinder.

During a first stroke of the pump cylinder, the hydraulic fluid is pressurized and flows via the second line into the working cylinder. In the working cylinder, the working piston is advanced by the pressure of the hydraulic fluid. At the end of the first stroke of the pump cylinder, due to the pump piston abutting the wall of the pump cylinder, there is a sharp rise in pressing force in the pressing machine, which thereupon switches off and reduces the pressing pressure. Due to the means, which are arranged in the second line for preventing the return flow, the pressure on the working piston is maintained in the working cylinder, so the pressing force applied to the piston rod and therefore to pressing jaw is also maintained.

Subsequently, hydraulic fluid is again pressed out of the storage container into the pump cylinder, as a result of which the pump piston is pushed back. In the next cycle and optionally in further cycles of the pump cylinder, hydraulic fluid is then again pressed into the working cylinder as described above, wherein the pressure in the working cylinder is maintained. Therefore, according to the invention it is provided that the piston displacement of the working cylinder is configured to be greater than the piston displacement of the pump cylinder. The piston displacement of the working cylinder is preferably at least twice as large as, in particular several times as large, as the piston displacement of the pump cylinder. Therefore, more than one stroke, preferably a plurality of strokes, of the pump cylinder can be used for filling the working cylinder.

When the stroke of the working piston reaches its pre-defined end, the pressure in the working cylinder therefore exceeds a predetermined value, and then the pressing process for the fitting is ended. The switching means in the third line opens in this position of the working piston and allows the hydraulic fluid to flow back into the storage container. As a result, the device is moved back into the initial position. The switching means can be switched hydraulically, mechanically or electronically.

In general terms, the technical problem indicated above is therefore also solved by a method for transmitting a mechanical force for driving a pressing device for press fittings, wherein a hydraulic fluid is pumped into a working cylinder with a pump cylinder in more than one stroke, wherein the pressure in the working cylinder is maintained between in each case two strokes of the pump cylinder and wherein the hydraulic fluid is discharged from the working cylinder after reaching an end pressure inside the working cylinder.

With the aid of the described device as a hydraulic force-transmitting device and the method described, for pressing in particular large press fittings it is possible to use more than one stroke of the pressing machine in order to achieve a sufficiently large stroke of the working cylinder at a sufficiently high pressure in the working cylinder.

The device therefore converts any number of pressing machine strokes to a pressing stroke. The active principle is hydraulic, as a result of which the force and the stroke length of the working cylinder can be variably adjusted. The magnitude of the force and the stroke length of the working cylinder depend, on the one hand, on the pressure generated by the pump cylinder and, on the other hand, on the precise configuration of the length and diameter of the working cylinder. These can be adapted to the respective application. For example, a work of 32 kN*80 mm stroke or 35 kN*100 mm stroke can be performed with a conventional pressing machine having a working capacity of 32 kN*40 mm stroke.

One advantage of the described device for transmitting a mechanical force for driving a pressing device for press fittings consists in that no deformation work is lost during pressing, since the pressing loop and the pressing jaw remains mechanically tensioned between the working strokes of the pressing machine, in other words, between two strokes of the pump cylinder. A new application of the pressing jaw is therefore advantageously prevented.

Furthermore, the complete pressing process is also extensively protected by the described device as a force-transmitting device, as is conventional in hydraulic sanitary presses. The protection is ensured in that the pressing process runs in a pressure-controlled manner and can be ended only by means of an emergency release.

A further advantage is that the device is compatible with the commercially available pressing machines since the described device is arranged between a pressing machine and a pressing jaw and the pressing force of the pressing machine is transmitted to the pressing jaw in at least two steps.

The above-described device is preferably developed in that the storage container has a lid which is pre-tensioned by at least one pressure element. The lid is designed to be movable for this purpose and is displaced by the compression spring in the direction of a discharge of the hydraulic fluid. The at least one pressure element can be implemented as at least one compression spring or as a pressure accumulator consisting of a diaphragm and a gas volume. As a result of the pre-tensioning, the oil storage container as a whole is free of air bubbles, as a result of which the device can be operated in all positions. The non-spring-loaded pump cylinder is filled with the aid of the static pressure in the storage container, so no suction of oil through the pump cylinder is necessary in order to fill it. Therefore no negative pressure results in the storage container and in the pump cylinder. The hydraulic fluid only flows due to the static pressure.

Furthermore, it is advantageously provided that the working piston in the working cylinder is pre-tensioned by means of a compression spring. After completion of the pressing cycle, the single-acting working cylinder pushes the oil volume into the storage container by means of the compression spring. The pressure force of the compression spring in the working cylinder is designed such that the generated pressure in the hydraulic fluid in the third line is sufficient to overcome the pressure force of the at least one pressure element arranged in the storage container.

The bottom of the pump cylinder is also advantageously provided with a ventilation hole, whereby a negative pressure is prevented from being produced in the working cylinder as a result of the working piston being pushed back.

In a further preferred manner, the means for preventing a return flow in the first line and in the second line are designed as a non-return valve, and the switching means of the third line are designed as a switching valve. The entire control of the course of an entire pressing cycle is controlled by means of the occurring pressures. The design of the non-return valves and of the switching valve depend on the respective application.

Alternatively, it can also be provided that the means for preventing a return flow are path-controlled, in that corresponding holes are arranged in the cylinders and release corresponding lines at suitable positions of the pistons and enable a flow of hydraulic fluid.

A further advantageous embodiment of the device consists in that a fourth line with a pressure limiting valve branches off in the flow direction after the non-return valve arranged in the second line and that a control line connects the pressure limiting valve to the switching valve. Therefore, a spring-loaded pressure limiting valve is connected to the connecting line between pump cylinder and working cylinder, in other words the second line, after the non-return valve. This valve opens from a defined switch-off pressure $p_A$ and with the line pressure controls the switching valve, which is designed as a 3-way valve having two switching positions. This valve is located in the third line, preferably in the base of the working cylinder, and opens the third line owing to the hydraulic switching signal emanating from the pressure limiting valve, in other words, the connection between the working cylinder and the storage container. As a result, the oil volume of the working cylinder is discharged into the storage container and the pressing process is therefore ended.

In order to be able to return the switching valve back into its initial position, it is provided in particular that the switching valve has a mechanical plunger and that the working piston is arranged in such a way that the working piston, during a return stroke, actuates the plunger and closes the switching valve.

A further particular development of the device described consists in that the third line has a throttle valve.

The reason for the arrangement of a throttle valve in the third line is the following. As a rule, the pressing pressure in the known pressing machines is used as a switching signal for terminating pressing process, as described above for the end of a stroke of the pump cylinder. These pressing machines are therefore force-controlled, just like the described device, which functions as a force-transmitting device. Accordingly, it is advantageous if the device or force-transmitting device ends the pressing process before the pressing machine ends the pressing stroke in the pump cylinder. For this reason, the third line, in other words the discharge line from the change-over valve into the storage container, is throttled. As a result, the pressure drop in the working cylinder and pump cylinder is temporally delayed. As a result of this delay, a correspondingly high residual pressure or sufficiently high residual force is held in the pump cylinder, so the pressing machine does not shut off prematurely, but rather only when the stroke abuts the pump cylinder, as described above. The switch-off of the pressing machine is accordingly equal in the last stroke to the switch-off in the first stroke or all further strokes up to the penultimate stroke.

In addition, a fifth line can be provided between the input of the throttle valve on the working cylinder side and the pump cylinder, in which means can be provided for preventing a return flow of hydraulic fluid from the pump cylinder into the third line, in particular a non-return valve. In particular at the start of discharge of the hydraulic fluid into the storage container, a portion, in particular a relatively large portion of the hydraulic fluid is discharged into the pump cylinder as a result. This ensures that the pressure in the pump cylinder does not drop too quickly and the connected pressing machine does not switch off. The pressure in the pump cylinder can therefore be maintained up to the end of the pressing machine stroke and an error-free switching off of the pressing machine can be ensured.

The flow of hydraulic fluid can also be taken to mean a large circuit with pump cylinder, working cylinder and storage container with first, second and third lines or a small circuit with pump cylinder and working cylinder with the second, third and fifth lines.

A further preferred embodiment of the described device consists in that the pump cylinder operates in the opposite direction to the working cylinder. As a result, a pressing machine whose pressing movement is converted into a pulling movement by means of an appropriately designed mechanical device can be used. This configuration has the advantage that the construction space for the described device can be kept short in the region of the pump cylinder.

In addition, it is advantageous if the pump cylinder and the working cylinder are arranged in series, as a result of which advantageous rotational machining of the housing, which accommodates both cylinders, is possible.

BRIEF DESCRIPTION OF THE DRAWINGS

The invention will be illustrated below using exemplary embodiments and with reference to the drawings. In the drawings:

FIG. 2 shows a perspective illustration of a device according to the invention with an attached receptacle for a pressing machine and a holder for a double roller plunger, FIG. 2a shows a side view according to FIG. 2 with identification of the sectional planes for FIGS. 3 to 5.

DESCRIPTION OF THE INVENTION

Figure 1:
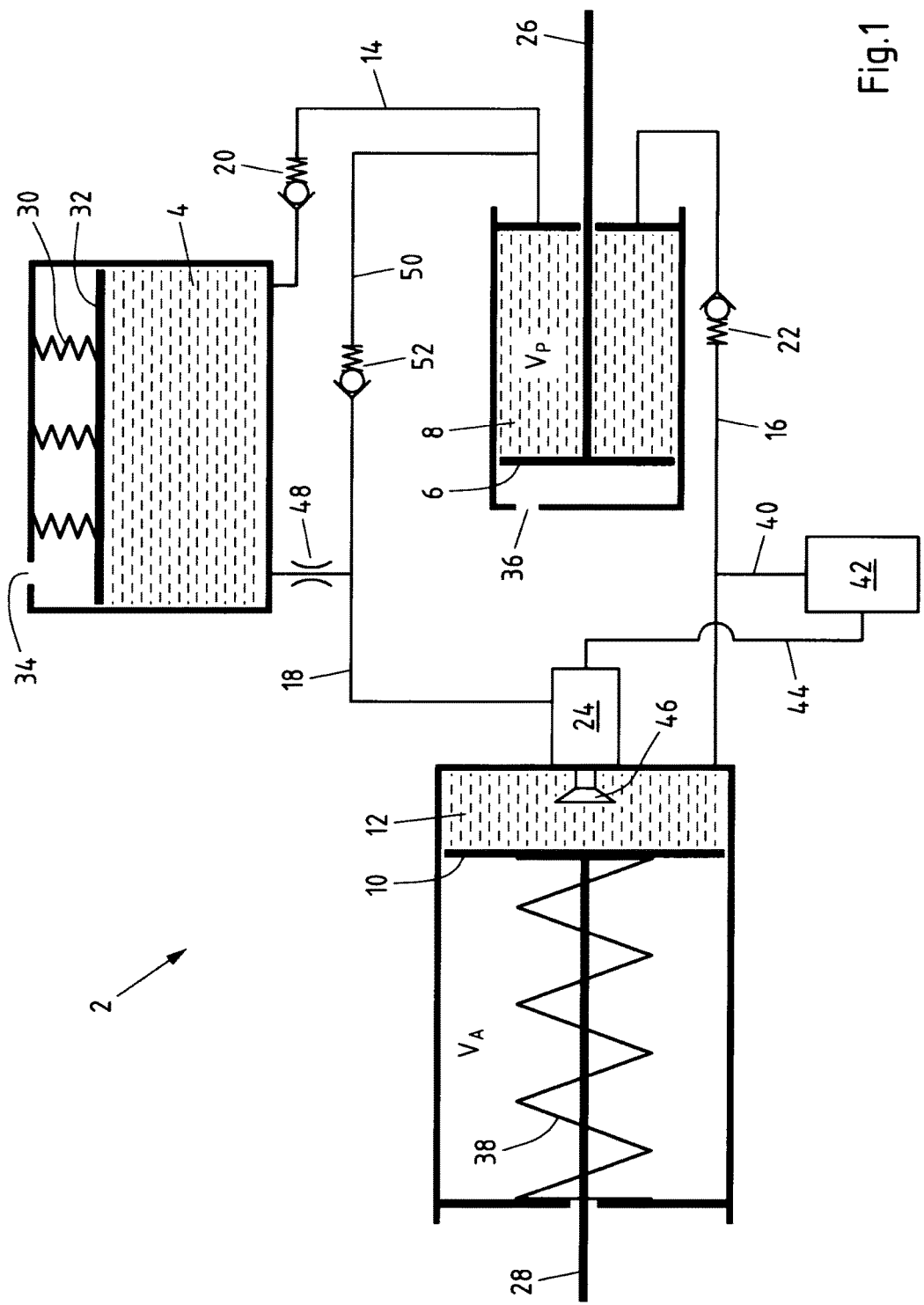
FIG. 1 shows a hydraulic circuit diagram for a device according to the invention.

In the following description of the various exemplary embodiments according to the invention, identical components are provided with the same reference numerals, even if the components in the different exemplary embodiments can have different dimensions or shapes.

FIG. 1 shows the basic structure in the form of a hydraulic circuit diagram and the mode of operation of a device 2 according to the invention for transmitting a mechanical force for driving a pressing device for press fittings. In this illustration both the elements of the device 2 according to the invention and optional and advantageous elements are shown.

The device 2 has a storage container 4 for hydraulic fluid, in the present case hydraulic oil. Furthermore, a pump cylinder 8 having a pump piston 6 and a working cylinder 12 having a working piston 10 are provided. A first line 14 connects the storage container 4 to the pump cylinder 8 and a second line 16 connects the pump cylinder 8 to the working cylinder 12. A third line 18 in turn connects the working cylinder 12 to the storage container 4. Therefore, a circuit is formed overall in which the hydraulic oil can circulate during a pressing cycle of the device 2.

A non-return valve 20 is provided in the first line 14 as a means for preventing a return flow of hydraulic oil from the pump cylinder 8 into the storage container 4. Therefore, the hydraulic oil can flow only from the storage container 4 into the pump cylinder 8.

A non-return valve 22 is likewise provided in the second line 16 as a means for preventing a return flow of hydraulic oil from the working cylinder 12 into the pump cylinder 8. This prevents hydraulic oil from flowing back from the working cylinder 12 into the pump cylinder 8 during the pressing cycle.

A switching valve 24 is provided at the bottom of the working cylinder 12 as a switching means for opening and closing the third line 18. The switching valve 24 is activated and opened if the stroke of the working piston 10 has reached its end position and the pressure of the hydraulic oil in the working cylinder 12 rises above a limit value. Opening of the switching valve therefore ends the pressing cycle of the device 2 according to the invention.

Furthermore, a pump piston rod 26 is connected to the pump piston 6, so a pressing or drawing machine can exert a force on the pump piston rod 26 in order to perform a stroke of the pump piston 8. A working piston rod 28 is likewise connected to the working piston 10 in order to drive a pressing device for actuating a pressing jaw. The device 2 according to the invention is therefore arranged as a hydraulic force-transmitting device between a pressing or drawing machine and a pressing device.

According to the invention, the piston displacement VA of the working cylinder 12 is configured to be greater than the piston displacement Vp of the pump cylinder 8. The piston displacement VA of the working cylinder 12 is preferably at least twice as large as, in particular several times as large as, the piston displacement Vp of the pump cylinder 8.

Therefore, more than one stroke of the pump piston 6 is necessary in order to achieve the maximum advance of the working piston 10.

At the beginning of a pressing cycle of the device 2, the pump cylinder 8 is largely, if not completely, filled with hydraulic oil that has been fed from the storage container 4 via the line 14. During a first stroke of the pump piston 6 in the pump cylinder 8, which is generated by a pressing or drawing machine not shown in FIG. 1, the hydraulic oil is pumped out of the pump piston 6 through the second line 16 into the working cylinder 12. As soon as the pump piston 6 strikes the pump cylinder 8, the pressing pressure or the tensile force in the pressing machine increases sharply, so the pressing machine switches off. From this point in time, hydraulic oil again flows out of the storage container 4 into the pump cylinder 8 before a second or further stroke of the pump piston 6 can begin.

The described non-return valves 20 and 22 and the switching valve 24 ensure, on the one hand, that the pressure in the hydraulic oil already pumped into the working cylinder 12 is maintained between two strokes of the pump piston 6. Therefore, the pressing force, which has already been exerted on the pressing device by the working piston rod 28 during a first stroke, is maintained. During each further stroke of the pump piston 6 in the pump cylinder 8, further hydraulic oil, which has flowed through between two strokes from the storage container 4 into the pump cylinder 8, is pumped into the working cylinder 12 via the second line 16. The working piston 16 is therefore pushed out step by step, to the left in FIG. 1.

If, for example during the third stroke of the pump piston 6, an end position of the working piston 10 is attained, the switching valve 24 switches over and the hydraulic oil flows back into the storage container 4 through the switching valve 24. The device 2 is then again in the initial state and ready for a new pressing cycle.

The elements of the device 2 illustrated below in connection with FIG. 1 are in each case optional, advantageous features which are not intended to limit the underlying inventive idea.

First of all, the storage container 4 has a lid 32 which is pre-tensioned by compression springs 30, so the hydraulic oil is kept under a static pressure in the storage container 4. No active movement of the pump piston 6 and the pump piston rod 26 is therefore required for filling the pump cylinder 8 between two strokes of the pump piston 6. Therefore, there is also no negative pressure within the device 2 and in particular no negative pressure within the first line 14. On the side of the lid 32 facing away from the hydraulic oil is provided at least one ventilation opening 34, so, when the lid 32 is displaced owing to the force of the compression springs 30, similarly no negative pressure is produced.

For the same reason, a ventilation hole 36 is provided in the bottom of the pump cylinder 8. Air flows through the ventilation hole 42 during the advance of the pump piston 6 into the resulting space inside the pump piston 6, and the creation of a negative pressure is again avoided.

Furthermore, the working piston 10 in the working cylinder 12 is pre-tensioned by means of a compression spring 38. By means of the compression spring 38, after the switching valve 24 has been opened by the working piston 10, the hydraulic oil is discharged from the working cylinder 12 without requiring an active operation of the working piston 10. The force of the compression spring 38 is sufficient to generate a pressure of the hydraulic oil in the third line 18, which overcomes the force of the springs 30 in the storage container 4 and allows hydraulic oil to flow into the storage container 4.

Previously, it has been explained that the switching valve 24 opens when the maximum stroke of the working piston 10 is reached and allows the hydraulic oil to flow into the storage container. The switching valve 24 can be controlled purely mechanically or electronically. A hydrodynamic control of the switching valve 24 is explained below.

For this purpose, a fourth line 40 with a pressure limiting valve 42 branches off in the flow direction downstream of the non-return valve 22 arranged in the second line 16. Furthermore, a control line 44 connects the pressure limiting valve 42 to the switching valve 24 and therefore generates a hydraulic control signal if the pressure in the hydraulic oil in the second line 16 is greater than a predefined value and the pressure limiting valve 42 opens. This control signal is therefore generated in particular if the working piston 10 has reached its end position or maximum stroke and therefore when the pump piston 6 is actuated further, the pressure in the second line 16 increases further.

Furthermore, the switching valve 24 has a mechanical plunger 46, which is actuated by the working piston 10 during a return stroke by the compression spring 38 and thereby closes the switching valve 24. As a result, the discharge of hydraulic oil from the working cylinder 12 is ended and the switching valve 24 is reset to the output state.

When the switching valve 24 is open, the hydraulic oil flows out of the working cylinder 12 through the third line 18 back into the storage container 4. In this case, a pressure drop also occurs within the pump cylinder 8.

As a rule, the pressing pressure in the known pressing machines is now used as a switching signal for ending the pressing operation. These pressing machines are therefore force-controlled, just like the present device 2 as a force-transmitting device. Accordingly, it is advantageous that the device 2 ends the pressing cycle before the pressing machine ends the pressing stroke for the pump piston 6. Since the controls of pressing machines and of the device 2 or of the force-transmitting device act in a similar manner, pressing machine types can exist, which interpret the switching off of the device 2 as a separate switch-off signal. In this case, malfunctions can occur on the part of the pressing machines.

To solve this specific problem, it is provided that the third line 18 has a throttle valve 48. The third line 18, in other words the discharge line from the switching valve 24 to the storage container 4, is therefore throttled.

As a result, the pressure drop in the working cylinder 12 and in the pump cylinder 8 is temporally delayed. As a result of this delay of the pressure drop, a correspondingly high residual pressure or sufficiently high residual force is maintained in the pump cylinder 6, so the pressing machine does not switch off prematurely, but rather only when the pump piston 6 abuts the pump cylinder 8 at the end of the pump stroke, as has been described for the first stroke of the pump piston 6.

Furthermore, a fifth line 50 is advantageously provided between the input of the throttle valve 48 on the working cylinder side and the first line 14, wherein a non-return valve 52 is again provided in the fifth line 50 as a means for preventing a return flow of hydraulic oil from the pump cylinder 8 into the third line 18.

As can also be seen from FIG. 1, the pump cylinder 8 operates with the pump piston 6 in the opposite direction to the working cylinder 12 with the working piston 10. This achieves a space-saving arrangement of the two cylinders in one arrangement.

The example of a device 2 according to the invention which is shown in FIG. 1 and illustrated above in the form of a hydraulic circuit diagram enables the discussion of all elements in an illustration in one plane. FIGS. 2 to 7 show a specific exemplary embodiment of a device 2 according to the invention in the form of construction drawings. In this case, the same reference numerals as previously used in FIG. 1 designate identical components and elements of the device 2, even if the specific design is different. The scaling is selected differently from FIGS. 4 and 5 in FIG. 3 in order, on the one hand, to show an overview of the entire device 2 with the connected components in FIG. 3 and, on the other hand, to be able to better illustrate the details within the device 2 on the basis of FIGS. 4 and 5.

FIG. 2 shows the device 2 according to the invention in a perspective view, while FIGS. 3 to 6 show different cross-sections. Since the various lines and valves of the structure according to the invention are arranged in different azimuthal planes, these elements are shown partially only in one of the cross-sections shown. All the Figures show the same axis A for orientation.

Figure 3:
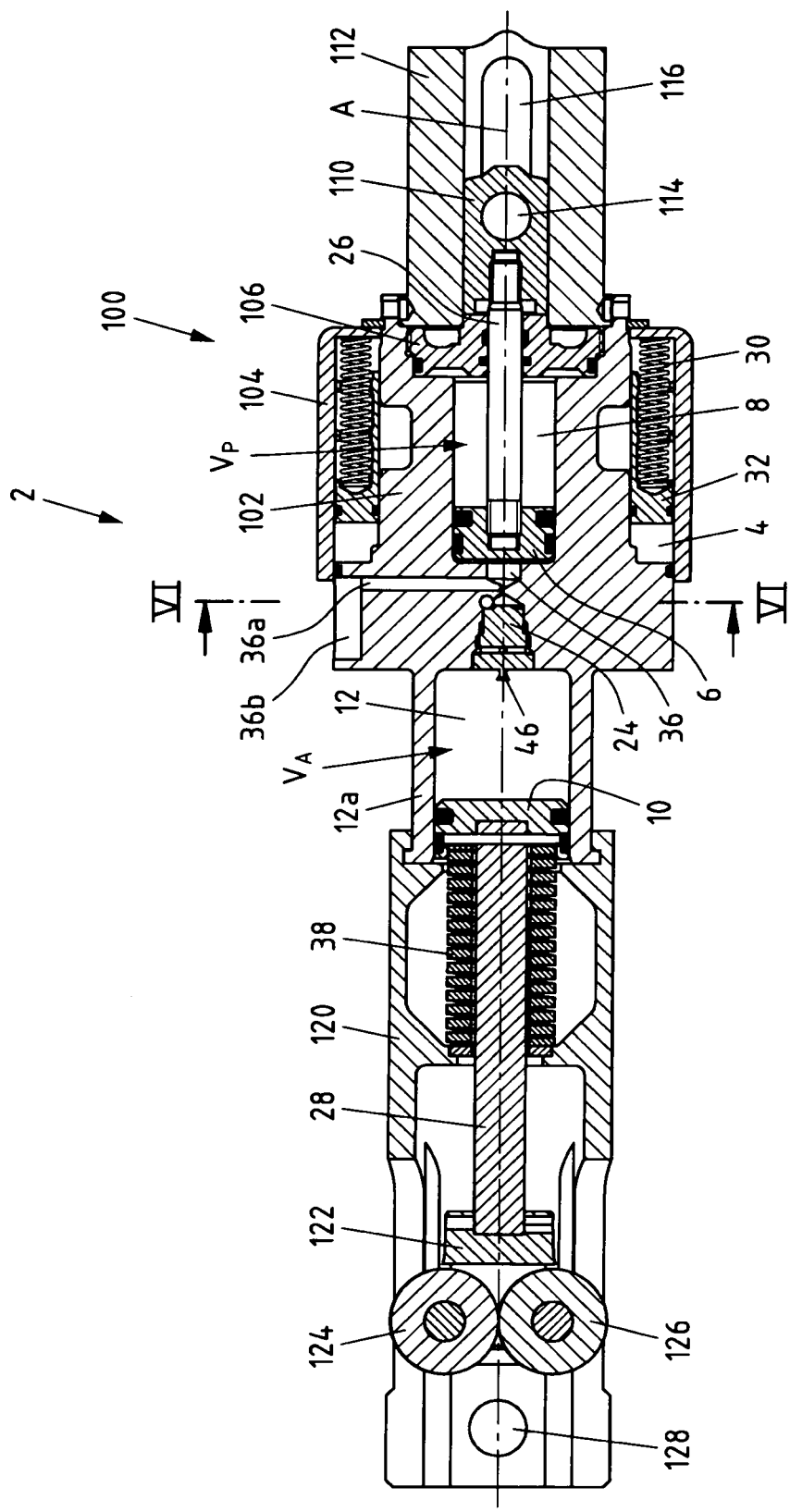
FIG. 3 shows the device according to the invention in cross-section along the line III-III in FIGS. 2a and 6.
Figure 4:
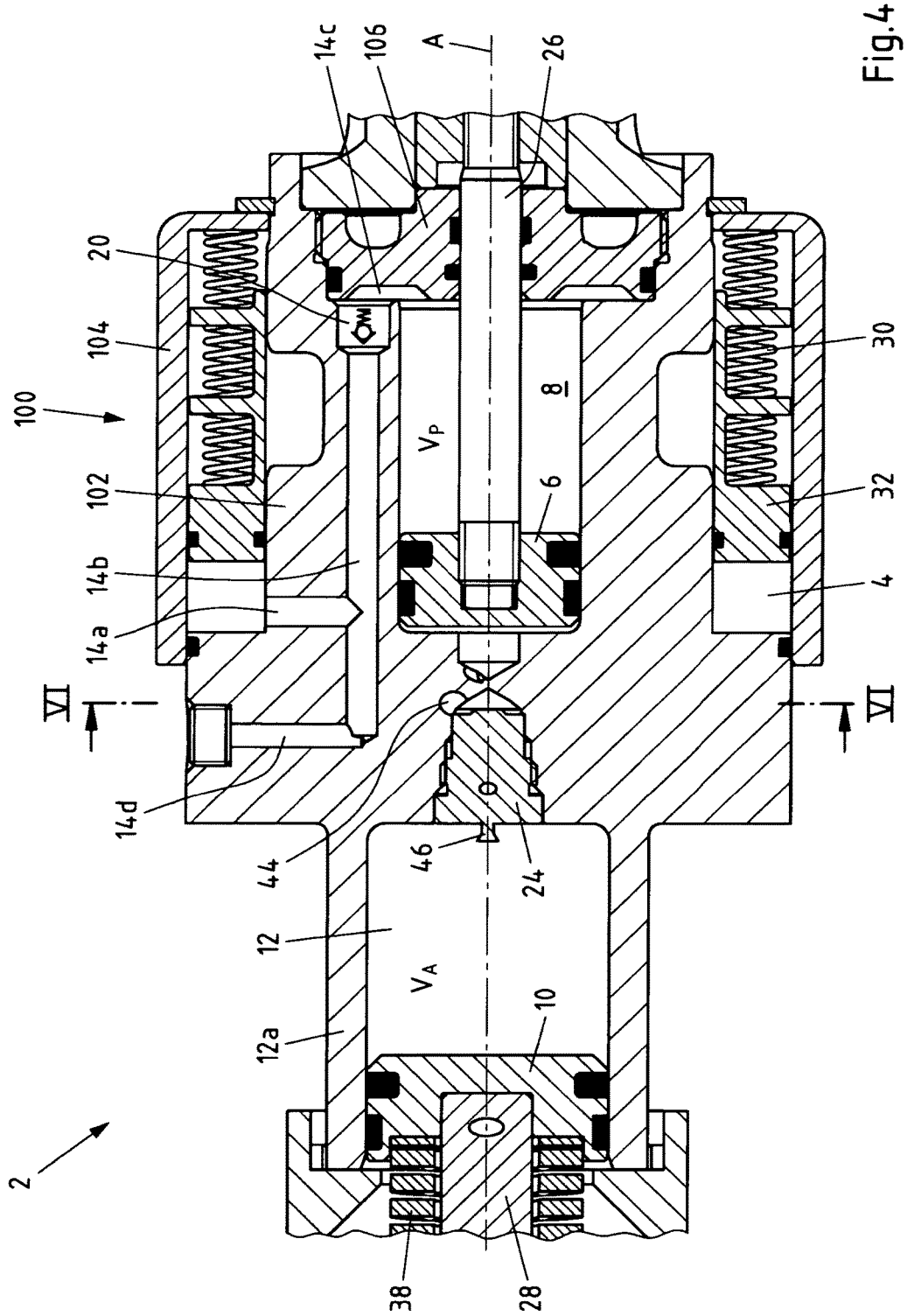
FIG. 4 shows the device according to the invention in cross-section along the line IV-IV in FIGS. 2a and 6.
Figure 5:
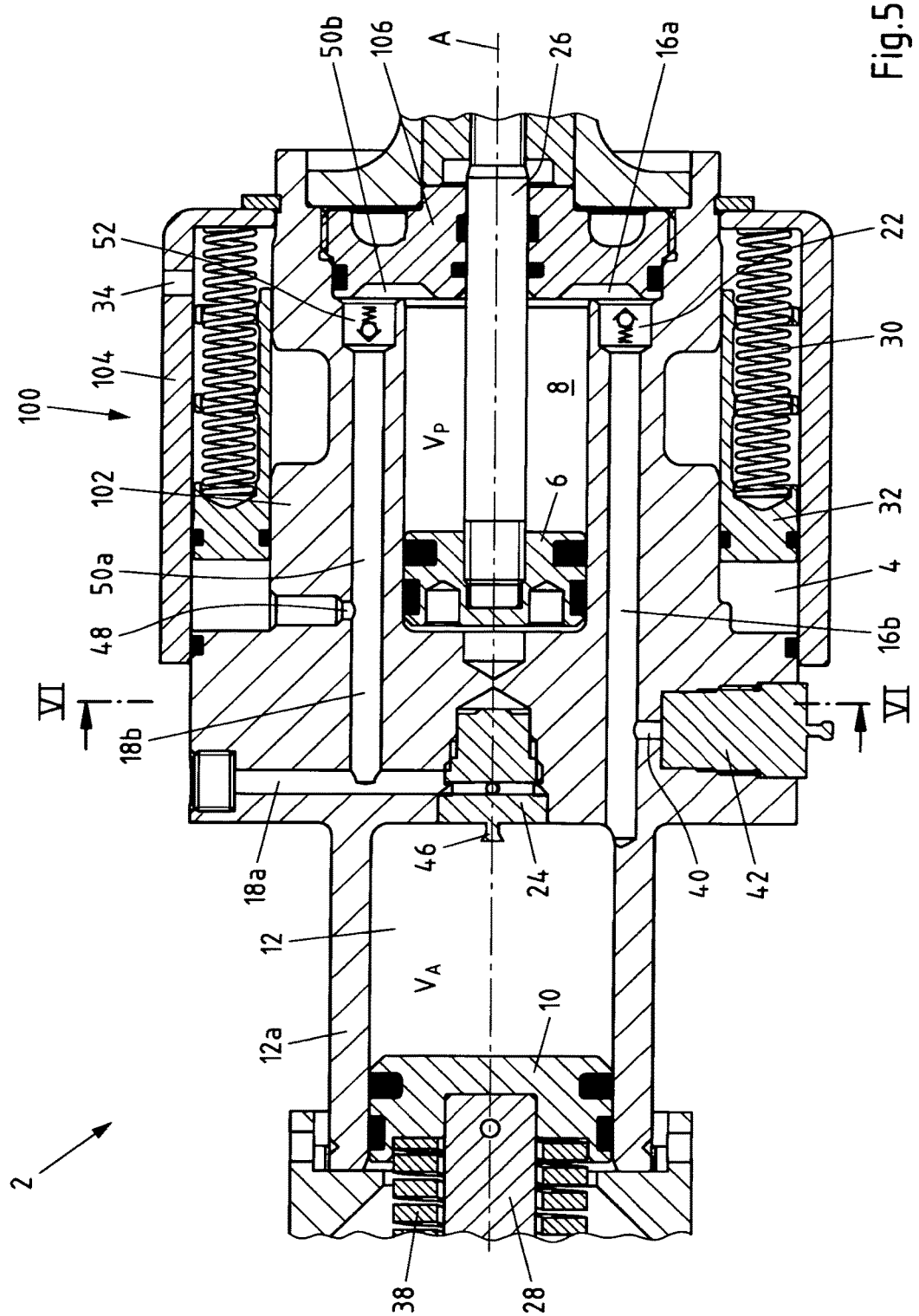
FIG. 5 shows the device according to the invention in cross-section along the line V-V in FIGS. 2a and 6.
Figure 6:
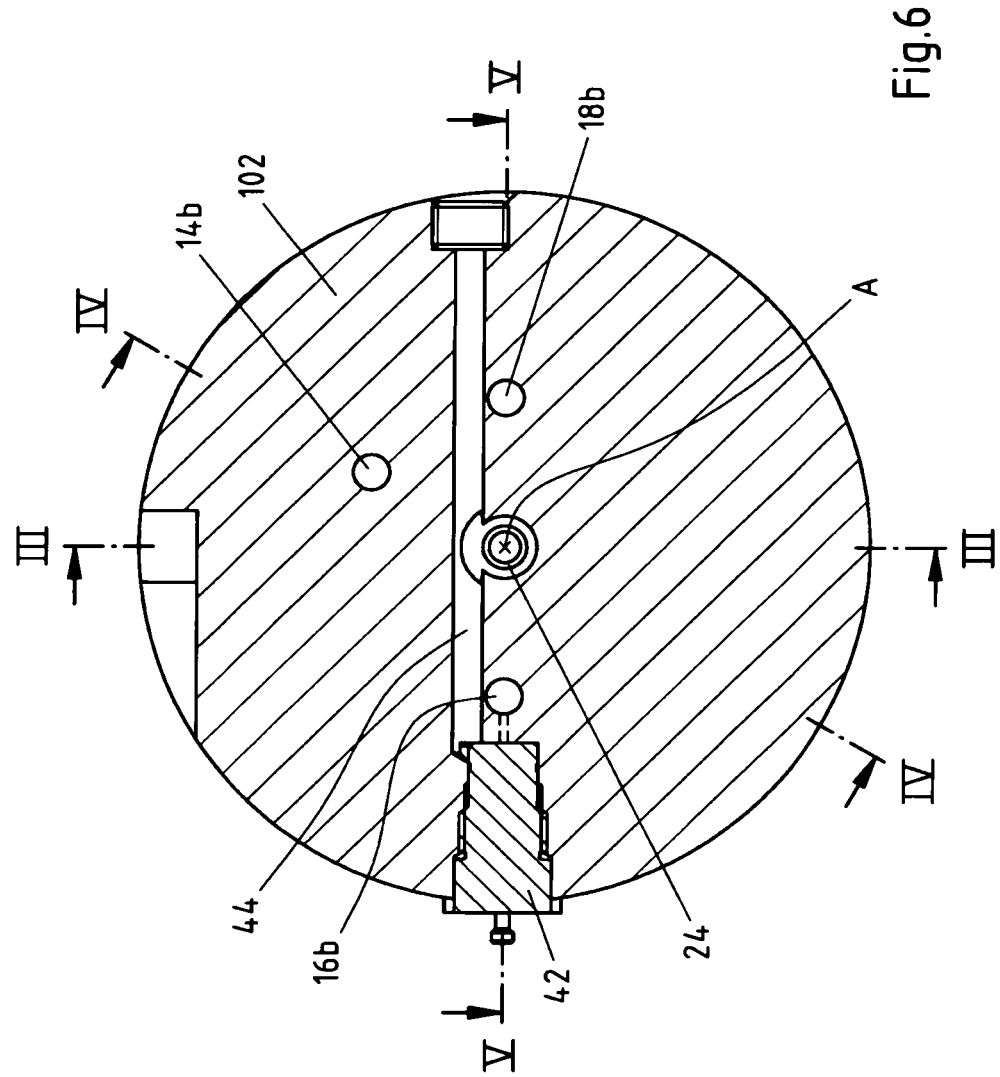
FIG. 6 shows the device according to the invention in cross-section along the line VI-VI in FIGS. 3, 4 and 5

In FIGS. 2a and 6, the numerals III, IV and V shows the direction of the cross-sections for FIGS. 3, 4 and 5. In FIGS. 3, 4 and 5, the direction of the cross-section, which is illustrated in FIG. 6, is once again identified by the number VI.

Furthermore, in the figures, the sealing elements for sealing the different elements from each other are shown as black surfaces, and these are not illustrated or identified in detail.

The device 2 has a housing 100 with an inner housing part 102 and an outer housing part 104. A storage container 4 for hydraulic oil is formed between the two housing parts 102 and 104. Arranged inside the storage container 4 is a plurality of axially acting compression springs 30 which, on the one hand, are mounted against the outer housing part 104 (to the right in the Figures) and act against a cover 32, which laterally delimits the storage container 4. The hydraulic oil present in the storage container 4 is put under a static pressure by means of the springs 30 and the lid 32.

Inside the inner housing part 102, a pump cylinder 8 is formed as a cylindrical hole parallel to the axis A, in which cylinder a pump piston 6 is arranged. The pump cylinder 8 is axially closed by a lid 106. Connected to the pump piston 6 is a pump piston rod 26, which is guided in the lid 106 and is in turn connected to a tie rod 110. The tie rod 110 is arranged within a receptacle 112 for a pressing machine which generates a tensile force (shown in FIG. 7) so it can move back and forth. For coupling to the pressing machine, a hole 114 is provided in which a pin can be accommodated, which in turn is guided in lateral elongated holes 116.

As FIG. 3 shows, an axial ventilation hole 36 is provided in the bottom of the pump cylinder 8, which is open towards the outside and towards a recess 36b on the outer side of the inner housing part 102 via a radially introduced hole 36a.

Furthermore, a cylindrical section 12a for the working cylinder 12 is formed on the inner housing part 102 and has a working piston 10. The working piston 10 is pre-tensioned in the direction towards the right in the Figures by means of a compression spring 38 and is connected to a working piston rod 28, which is accommodated in a cylindrical housing part 120. The working piston rod 28 is connected to a double roller plunger 122 guided in the housing part and which supports the two rollers 124 and 126. This arrangement is known per se and is used for actuation of a pressing jaw (not shown), which can be fastened to the housing part 120 by means of a pin guided in a hole 126.

As FIG. 4 shows, a first line 14 is formed in the inner housing part 102 for connecting the storage container 4 to the pump cylinder 8 and comprises a plurality of line sections. The line section 14a is designed as a radially introduced hole, is in contact with the storage container 4 and extends inwards in the direction of a line section 14b, which is designed as an axial hole. The hole 14b is connected by means of a non-return valve 20 to a line section 14c formed as a recess in the cover 106. A radially outwardly extending hole 14d is formed at the other end of the hole 14b, through which the hydraulic oil can be admitted, and which can be closed by means of a closure.

FIG. 5 now shows the embodiment of a second line 16 comprising two line sections and connecting the pump cylinder 8 to the working cylinder 12. A line section 16a is formed as a recess in the lid 106, said lid being connected via a non-return valve 22 to the line section 16b designed as an axial hole. The line section 16b opens into the working cylinder 12.

FIG. 5 likewise shows a third line 18 having a plurality of line sections for connecting the working cylinder 12 to the storage container 4. A line section 18a in the form of a radial hole connects the working cylinder 12 to the outside of the inner housing part 102 via a switching valve 24 and can be closed there by a closure (not shown). A line section 18b is designed as an axial hole and connects the line section 18a to a throttle valve 48, which opens into the storage container 4.

Furthermore, FIG. 5 shows that a fourth line 40 branches off in the direction of flow after the non-return valve 22 in the line section 16b of the second line 16 and leads to a pressure limiting valve 42. As can be seen in FIG. 6, a control line 44 connects the pressure limiting valve 42 to the switching valve 24 in order to transmit a hydraulic control signal to the switching valve 24.

The switching valve 24 has a mechanical plunger 46 facing the interior of the working cylinder 12. The working piston 10 is arranged such that, during a return stroke by the compression spring 38, the working piston 10 actuates the plunger 46 and closes the switching valve 24.

As FIG. 5 also shows, the line section 18b merges into a line section 50a of a fifth line 50, which is provided between the input of the throttle valve 48 on the working cylinder side and the pump cylinder 8. The line section 50a merges via a non-return valve 52 into a line section 50b, which is formed in the cover 106 and is connected to the pump cylinder 8.

According to the invention, the piston displacement $V_A$ of the working cylinder 12 is now configured to be greater than the piston displacement $V_P$ of the pump cylinder 8, wherein it is preferred if the piston displacement $V_A$ of the working cylinder 12 is at least twice as large, in particular several times as large, as the piston displacement $V_P$ of the pump cylinder 8. These size ratios make it possible for the working cylinder 12 to be filled by more than one stroke of the pump piston 6.

As can be seen from the Figures, the pump cylinder 8 operates in the opposite direction to the working cylinder 12. This means that a volume reduction within the pump cylinder 8 is effected by a movement of the pump piston 6 in the Figures to the right and a volume enlargement within the working cylinder 12 is effected by a movement of the working piston 10 in the Figures to the left. Therefore, on the drive side, the tie rod 110 connected to the pump piston rod 26 must be pulled out of the pump cylinder 8 for a stroke of the pump piston rod. For this purpose, a pressing machine having a kinematic reversal can be used, which is illustrated below with reference to FIG. 7.

Figure 7:
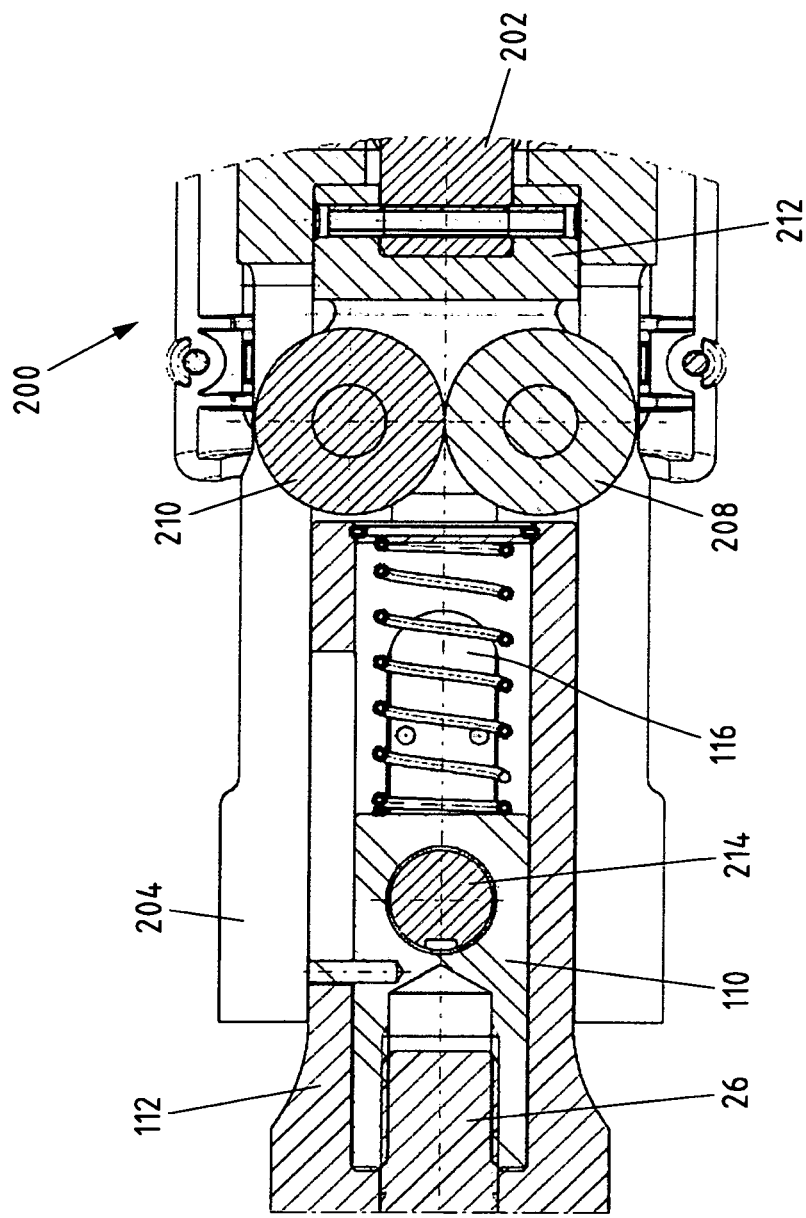
FIG. 7 shows a device according to the invention with an attached pressing machine.

In FIG. 7, the receptacle 112 is described for a pressing machine generating a tensile force for the pressing machine 200, which is suitable per se for pressing fittings and pipe connectors. The pressing machine 200 is provided to advance a piston 202 relative to tabs 204, which are connected to pressing machine 200, and therefore to move a pair of rollers 208 and 210 via a holder 212. The design of the pair of rollers is not of importance here, the function thereof is required only during pressing of fittings and shall not be explained further here. In any case, the rollers 208 and 210 linearly transmit the force generated by the piston 202 to the receptacle 112.

Furthermore, a securing bolt 214 is provided, which is releasably connected to the tabs 204. By means of the securing bolt 214, the tie rod 110, which is arranged inside the receptacle 112, is connected to pressing machine 200. If pressing machine 200 is now actuated and the piston 202 is moved relative to pressing machine 200 and is therefore also moved relative to the tabs 204, then there is a corresponding relative movement between the receptacle 112 and the tie rod 110. This relative movement then causes a movement of the housing 100 resting against the receptacle 112 relative to the pump piston rod 26 connected to the tie rod 110.

Therefore, by actuating the pressing machine 200, the pump piston rod 26 together with the tie rod 110 is pulled out through the receptacle 112, so a pump stroke is carried out. After completion of the movement stroke of the piston 202, the pump stroke of the pump piston 6 within the pump cylinder 8 is concluded.

The invention claimed is:

1. A device for transmitting a mechanical force for press fittings comprising:
   a storage container for a hydraulic fluid;
   a pump cylinder with a pump piston;
   a working cylinder with a working piston, wherein the working piston's displacement in the working cylinder is greater than the pump piston's displacement in the pump cylinder;
   a first line connecting the storage container to the pump cylinder, wherein a non-return valve prevents a return flow of the hydraulic fluid from the pump cylinder into the storage container;
   a second line connecting the pump cylinder to the working cylinder, wherein a non-return valve prevents a return flow of the hydraulic fluid from the working cylinder into the pump cylinder;
   a third line connecting the working cylinder to the storage container, wherein a switching valve opens and closes the third line;
   a fourth line with a pressure limiting valve that branches off in the direction of flow after the non-return valve of the second line and a control line that connects the pressure limiting valve to the switching valve; and
   wherein the switching valve has a mechanical plunger, wherein the working piston is arranged in such a way that the working piston, during a return stroke, actuates the mechanical plunger and closes the switching valve.

2. The device of claim 1, wherein the working piston's displacement in the working cylinder is at least twice as large as the pump piston's displacement in the pump cylinder.

3. The device of claim 1, wherein the storage container has a cover which is pre-tensioned by at least one of a compression spring or a pressure accumulator.

4. The device of claim 1, wherein the working piston in the working cylinder is pre-tensioned by a compression spring.

5. The device of claim 1, wherein the third line has a throttle valve.

6. The device of claim 5, wherein a fifth line is provided between the throttle valve and the pump cylinder, further comprising a means of preventing a return flow of the hydraulic fluid from the pump cylinder into the third line.

7. The device of claim 1, wherein the pump cylinder operates in an opposite direction to the working cylinder.

8. A method for transmitting a mechanical force for press fittings comprising the steps of:
   providing the device according to claim 1;
   pumping a hydraulic fluid into the working cylinder with a pump cylinder in more than one stroke;
   maintaining the pressure in the working cylinder between strokes of the pump cylinder in each case; and
   discharging the hydraulic fluid from the working cylinder after reaching an end pressure inside the working cylinder.

9. The method of claim 8, wherein the hydraulic fluid is discharged in a throttled manner, and the pressure of the hydraulic fluid is used shortly after the start of the discharge from the working cylinder to switch off generation of the pressure build-up in the pump cylinder.

10. The device of claim 6, wherein the means for preventing a return flow of hydraulic fluid from the pump cylinder into the third line is a non-return valve.

* * * * *